United States Patent Office 3,187,062
Patented June 1, 1965

3,187,062
CYCLOOLEFIN PRODUCTION
Harold Shechter, Columbus, Ohio, assignor, by mesne assignments, to Columbian Carbon Company, a corporation of Delaware
No Drawing. Filed June 14, 1962, Ser. No. 202,384
17 Claims. (Cl. 260—666)

This application is a continuation-in-part of application Serial No. 50,836, filed August 22, 1960, and of application Serial No. 84,766, filed January 25, 1961, both of which are now abandoned.

This application relates to the preparation of cycloolefins from substituted or unsubstituted open chain conjugated diolefins by means of catalytic compounds not heretofore known to be useful for the reaction. Particular cycloolefins with which the invention is concerned are 1,5-cyclooctadiene, 1,5,9-cyclododecatriene, and substitution products and isomers thereof.

In the prior art, many compounds, organic and inorganic, have been proposed as catalysts or initiators for similar reactions, including nickel carbonyl itself and compounds of nickel, cobalt, and iron, sometimes in combination with phosphorous and nitrogen compounds, as well as various organo aluminum compounds in combination with certain titanium and chromium compounds.

It has now been discovered that certain compounds, known in themselves as a class of compounds, are particularly effective as catalysts or initiators in the oligomerization, for instance the dimerization and trimerization, at elevated temperatures, of conjugated open chain diolefins to cycloaliphatic polyolefins having at least eight carbon atoms in the ring and at least two carbon-to-carbon double bonds in the ring.

The compounds useful as catalysts according to the invention have the empirical formulas $[(RO)_3Z]_3NiCO$, $(R_3Z)_3NiCO$, and $[R_x(RO)_{3-x}Z]_3NiCO$, and mixtures thereof, where Z is an element of group VA of the long or Bohr periodic table of the elements having an atomic weight of between about 30 and about 122, that is P, As, or Sb, $x$ is 1 or 2, and R is an organic or substituted organic radical. Prior reference to compounds of this nature may be found in an article by Malatesta and Sacco, Ann. Chem. (Rome), vol. 44, pages 134–138 (1954).

Methods of preparing such compounds are also suggested by Malatesta and Sacco; these methods are applicable for any of the compounds comprehended by the above formulas. The preferred catalysts for use in this invention are those in which Z is phosphorous, and in particular, the phosphites. A relatively pure catalyst having 90% or more, by weight, of the monocarbonyl compound is preferred. Useful results may be obtained, however, with catalysts having a substantial proportion, as little as about 10%, of the monocarbonyl compound, by weight, and larger proportions of other compounds for example having more than one carbon monoxide group. Thus, the catalysts of the invention may comprise the above in admixture with other compounds such as bis(triphenylphosphite)nickel dicarbonyl $$[(C_6H_5O)_3P]_2Ni(CO)_2$$

often inherently present because of the method of preparation of the related monocarbonyl compound. Yields of desired product using such mixed catalysts are generally lower as compared with the relatively pure compound containing a single carbon monoxide group.

The phosphine, arsine, stibine, phosphite, arsenite, and antimonite portions of the above formulas may comprise, as the radical "R," a wide variety of hydrocarbon and substituted hydrocarbon radicals. Examples of open-chain alkyl radicals preferably having less than about 20 carbon atoms, as the radical "R," are methyl, ethyl, propyl, butyl, hexyl, dodecyl, isooctyl, isobutyl and isopentyl. Useful cycloalkyl hydrocarbon radicals include cyclopentyl, cyclohexyl, cyclooctyl, and similar groups. Representative aryl radicals are phenyl, biphenyl, α-naphthyl, and β-naphthyl.

Substituted alkyl, cycloalkyl, and aryl hydrocarbon radicals are similarly useful as "R" of the above formulas. Thus, halogen substituted and acyl substituted hydrocarbon radicals are suitable. Similarly, alkylaryl and arylalkyl radicals are within the definition for "R," as used herein. Suitable halogens are chlorine, fluorine, bromine, and iodine. Examples of halogen substituted radicals are p-chlorophenyl, 2-chloroethyl, m-(trifluoromethyl)phenyl, bromocyclohexyl, and similar radicals. Representative alkylaryl radicals are m-tolyl, p-tolyl, o-tolyl, and 3,5-xylyl. Arylalkyl radicals according to the invention are represented by the benzyl and benzhydryl radicals. Other useful substituted hydrocarbon radicals include p-methoxyphenyl and p-acetophenyl. Known homologous radicals provide further useful variants. Also, predominantly hydrocarbon heterocyclic compounds may be considered to be substituted hydrocarbons as regards this application.

The radicals "R" may be identical or different within the meaning of the formulas given. Examples of compounds wherein the radicals are the same are tris(triphenylphosphite)nickel monocarbonyl, tris(tri-p-tolylphosphite)nickel monocarbonyl, tris(triphenylphosphine)nickel monocarbonyl, tris(tricyclohexylphosphine)nickel monocarbonyl, and similar compounds within the above-defined formulas. Instances of catalysts prepared so that the radical "R" varies within a given catalyst are bis(triphenylphosphite), tri-p-tolylphosphite nickel monocarbonyl, bis(triphenylphosphite) triethylphosphite nickel monocarbonyl, and tris(2-ethylhexyl-, octyl-, phenylphosphite) nickel monocarbonyl. Similar variations may be made where phosphine compounds are utilized, and both phosphine and phosphite compounds may be bonded to the Ni°. Comparable compounds derived from $Ni(CO)_4$ but with arsines, arsenites, stibines, and/or antimonites substituted for the phosphines and phosphites are useful.

The concentration of catalyst in the reaction is suitably 0.001% to 10% by weight of the conjugated diolefin monomer and the preferred quantity is between 0.05% and 4% by weight. Excessive quantities of catalyst are not proportionately beneficial. Excellent results have been achieved at catalyst concentrations of 0.2%, 0.5%, 1.5% and 3%.

Polymerization inhibitors which may be present if desired include phenol, catechol, p-tertiary-butyl catechol, resorcinol, hydroquinone, and other known compounds. Although no particular benefit is achieved, polymerization inhibitors may actually be removed from the diolefin, by means such as pellets of potassium hydroxide, prior to the reaction. If such inhibitors are present and are not removed, the amounts thereof may be between about 0.001% and 4% based on the weight of the open-chain conjugated diolefin. It is not unusual to find that amounts in this range have been added to materials such as butadiene to stabilize them during storage. Pressures between about 20 p.s.i.g. and about 1000 p.s.i.g. are applicable, usually depending upon the temperature at which the reaction is conducted, suitably between about 40° C. and 250° C. Preferably, the temperature is between 70° C. and 170° C., the optimum temperature being between about 90° C. and 150° C. Using tris(triphenylphosphite)nickel carbonyl, a temperature of about 120° C. is preferred, under certain conditions. The time of reaction depends in large part upon the temperature; suitable times are between 0.05 and 25 hours, and more desirably between about 0.2 and 10 hours.

The reaction may be batch or continuous, and with or without a solvent. Suitable solvents are paraffinic, cycloparaffinic, olefinic, cycloolefinic and aromatic hydrocarbons, including benzene, toluene, petroleum naphtha, hexane, heptane, isooctane, cyclohexane, cyclopentane, cyclooctadiene, and similar materials. Other solvents known to be useful for similar reactions, such as tetrahydrofuran, are optional. Most desirably, the only materials present in the reaction zone in substantial quantities are the diolefin monomer, the catalyst, and the products of reaction.

The monomer useful according to the present invention is an open-chain conjugated diolefin, preferably one which is in a gaseous or vapor state at room temperature and atmospheric pressure. The preferred diolefin is 1,3-butadiene. Other useful conjugated open-chain diolefins, particularly 1,3-diolefins, include 2-methyl-1,3-butadiene (isoprene); 1,3-pentadiene (piperylene); phenyldiolefins; 2-chloro-1,3-butadiene (chloroprene); 2,3-dicholoro-1,3-butadiene; and 2,3-dimethyl-1,3-butadiene. The halogen-substituted conjugated open-chain diolefins preferably have no more than two halogen atoms substituted for hydrogen in each diolefin molecule. Mixed halogen derivatives such as chloro-bromo-1,3-butadienes may be used. Other compounds which form cycloolefins having at least eight carbon atoms in the ring may also be used, an example being 2,4-hexadiene.

The diolefin should be relatively pure, although it may comprise relatively small amounts of impurities inherently present such as water, monoolefins, 1,2-diolefins, carbonyl compounds, and acetylenes. Normally these materials appear in amounts between about 10 p.p.m. (parts per million) and 500 p.p.m. Excessive amounts of certain impurities react with the catalyst or are detrimental in other ways and if not removed, are wasteful of catalyst, for example. The quantity of water in the diolefin monomer may be reduced by freezing or by the use of desiccants or dehydrating agents such as calcium sulfate (e.g. "Drierite"), calcium carbide, calcium oxide, or others known in the art. Ferrous salts, thiosulfites, sulfites, or other materials may be used to reduce peroxide compounds.

In making the catalyst as suggested by Malatesta and Sacco, the following representative procedure is useful. One mole of nickel carbonyl is mixed with four moles of triphenylphosphite at 0° C. and the mixture gradually heated over a period of about one hour to a temperature of about 130° C., where it is kept for approximately one hour. The reaction mixture is then cooled and poured into methanol, whereupon crystals of material are deposited. These crystals comprise about 50% to 75% tris(triphenylphosphite) nickle monocarbonyl and about 25% to 50% bis(triphenylphosphite) nickel dicarbonyl. This method differs somewhat from the procedure of Malatesta et al. in that in said procedure the liquid reaction product was held at room temperature until crystals formed, which were recrystallized from ethanol. Although the pure "tris" compound is preferred as the catalyst of the invention, good results are achieved where a substantial proportion of the catalyst conforms to the formula set forth herein for the monocarbonyl compounds. The co-pending application of R. F. Clark and C. D. Storrs, Serial No. 50,969, filed August 22, 1960, gives other methods of making catalysts used in this invention.

The manipulative procedures of conducting the reaction are similar to know processes of conducting cyclooligomerization of conjugated open-chain diolefins, but are critical in some respects. For instance, the catalysts of the invention are more effective in initiating the reaction at certain temperatures than at others. The description relates primarily to batch operations; but, as stated elsewhere herein, continuous processes may be used as well.

In the batch process the following representative procedure was used. The dimerization of butadiene using the catalyst complex was carried out in a 500 ml. Magne Dash autoclave. The autoclave was thoroughly cleaned and 1.5% by weight (1.5 grams) of the catalyst was added thereto. The autoclave was sealed then and was placed under a vacuum. Butadiene (100 grams) was added to the evacuated autoclave from a bomb, which was heated to insure complete transfer of the butadiene. After addition of the butadiene, agitation was commenced. The autoclave heaters were then turned on and the mixture heated to the control temperature of 148° C. Once the control temperature was reached, it was maintained for a period of 40 minutes. Maximum pressure reached during the reaction was about 475 p.s.i.g. After the 40 minutes residence time, the autoclave was cooled to 40° C. Unreacted butadiene was vented into an evacuated bomb cooled in a Dry Ice-acetone bath, and upon completion of venting the crude product was removed from the autoclave and analyzed. In other runs, a similar manipulative procedure was used, with variations being made in the quantity and purity of catalyst, time, temperature and pressure.

*Examples 1–20*

Using the foregoing procedure, the following examples of the process were carried out. Unless otherwise stated, the amount of catalyst was 1.5% by weight of the monomer.

| Example number | Grams butadiene | Catalyst | Time, min. | Temp., °C. | Conversion | Analysis | | |
|---|---|---|---|---|---|---|---|---|
| | | | | | | COD | VCH | HBM |
| 1 | 103 | 40% Bis(triphenylphosphite) nickel dicarbonyl plus 60% tris(triphenylphosphite) nickel carbonyl. | 20 | 148 | 72 | 67.8 | 13.2 | 18.5 |
| 2 | 101 | ____do____ | 20 | 160 | 74 | 68.3 | 13.2 | 18.5 |
| 3 | 103 | 20% Bis(triphenylphosphite) nickel dicarbonyl plus 80% tris(triphenylphosphite) nickel carbonyl. | 20 | 148 | 71 | 70.4 | 12.6 | 17 |
| 4 | 103 | ____do____ | 35 | 160 | 80 | 72.8 | 12.6 | 14.6 |
| 5 | 102 | Tris(triphenylphosphite) nickel carbonyl. | 35 | 160 | 81 | 73.7 | 12.7 | 13.6 |
| 6 | 103 | Tris(triphenylphosphite) nickel carbonyl (3.0% catalyst, based on monomer weight). | 35 | 160 | 81 | 72.9 | 13.0 | 14.1 |
| 7 | 102 | [Bis(triphenylphosphite)] trimethylphosphite nickel carbonyl. | 87 | 160 | 61 | 17.6 | 45.2 | 37.8 |
| 8 | 95 | [Bis(triphenylphosphite)] tri-p-tolylphosphite nickel carbonyl. | 52 | 160 | 78 | 59.7 | 23.4 | 16.9 |
| 9 | 104 | [Bis(triphenylphosphite)] tri-1-naphthylphosphite nickel carbonyl. | 37 | 160 | 77 | 68.6 | 14.9 | 16.5 |
| 10 | 109 | Tris(tri-1-naphthylphosphite) nickel carbonyl. | 49 | 160 | 78 | 62.9 | 18.4 | 18.7 |
| 11 | 102 | Tris(triphenylphosphite) nickel carbonyl. | 35 | 140 | 72 | 71.5 | 14.2 | 14.3 |
| 12 | 84 | [Bis(triphenylphosphite)] triethylphosphite nickel carbonyl. | 72 | 148 | 66 | 51.3 | 30.3 | 18.4 |
| 13 | 104 | [Bis(triphenylphosphite)] trihexylphosphite nickel carbonyl. | 54 | 148 | 77 | 59.4 | 18.5 | 22.1 |
| 14 | 104 | Tris(triphenylphosphite) nickel carbonyl. | 35 | 148 | 84 | 71.0 | 13.4 | 16.6 |

See footnotes at end of table.

TABLE—Continued

| Example number | Grams butadiene | Catalyst | Time, min. | Temp., °C. | Conversion | Analysis | | |
|---|---|---|---|---|---|---|---|---|
| | | | | | | COD | VCH | HBM |
| 15 | 103 | [Bis(triphenylphosphite)] mixed-2-ethylhexyl otylphenylphosphite nickel carbonyl. | 60 | 148 | 80 | 57.5 | 17.4 | 23.1 |
| 16 | 103 | Tris(triphenylphosphite) nickel carbonyl (0.5% catalyst, based on monomer weight). | 127 | 148 | 76 | 59.2 | 21.3 | 19.5 |
| 17 | 98 | Tris(triphenylphosphite) nickel carbonyl. | 60 | 148 | 75 | 60.8 | 21.4 | 17.8 |
| 18 | 105 | Tris(triphenylphosphite) nickel carbonyl (polymerization grade butadiene). | 40 | 148 | 75 | 71.5 | 14.4 | 14.1 |
| 19 | 102 | Tris(triphenylphosphite) nickel carbonyl. | 55 | 148 | 79 | 73.5 | 14.2 | 12.3 |
| 20 | 105 | ......do...... | 40 | 148 | 79 | 71.5 | 13.0 | 15.5 |

VCH=1,4-vinylcyclohexene.
COD=1,5-cyclooctadiene.
CDT=1,5,9-cyclododecatriene.
HBM=Materials boiling at a higher temperature than COD, including higher oligomers such as CDT. Usually CDT comprises about ⅓ to ⅔ of the weight of the HBM.

$$\text{Conversion} = \frac{\text{wt. of butadiene converted to product}}{\text{wt. of butadiene introduced into reactor}} \times 100$$

Other conditions were used with comparable results. Thus, at temperatures, at 10° intervals, between about 120° C. and 180° C., good results were found. The catalyst, at concentrations of 0.2% by weight, was found to provide good yield of cyclooctadiene. Pressures of below 200 p.s.i.g. and above 900 p.s.i.g. were found to be satisfactory, with the usual pressure being about 400 p.s.i.g. The time of reaction was also varied to give in general shorter times at higher temperatures, and conversely, longer times with lower temperatures. As described above, other conjugated open-chain olefin monomers and other catalysts within the invention are useful to give comparable results. Efficient agitation is important, particularly at temperatures above about 170° C.; otherwise, solid polymers tend to form on heated surfaces. Generally conditions which give the higher yields are preferred, since only a few percent greater yield will allow otherwise impracticable conditions, such as doubling the reaction time.

As indicated above, other cyclooligomers than the dimers are prepared according to the invention. Thus more or less 1,5,9-cyclododecatriene, 1,5,9,13-cyclohexadecatetraene and similar oligomers are obtained using suitable variations in the reaction conditions.

The products of reaction are of known utility, as solvents, monomers useful in polymerizations, and as chemical intermediates. For example, the cyclopolyolefins may be partially or completely hydrogenated to cycloolefins or cycloalkanes. "By-products" such as 1,4-vinylcyclohexene are useful in preparing polymers. Part of the higher boiling material is a polymer which can be cured by heating in air.

The diolefins useful according to the invention are those produced by conventional processes. For instance, the butadiene used in the above examples was prepared in a commercial plant by the dehydrogenation of butene, followed by purification with cuprous ammonium acetate. A crystalline complex of the cuprous ammonium acetate with butadiene is formed, and the butadiene is released from the complex by the application of heat. As has been known since 1950 and earlier, from commercial butadiene plant operation in this country, this process gives butadiene of about 95% to 99% purity with little variation for a given set of conditions.

The butadiene used in the above examples (with the exception of Example 18) was ordinary "plant" butadiene not subjected to any particular purification procedures, except in most cases the material was passed through a column of silica gel to remove excessive amounts of water and apparently a substantial proportion of the polymerization inhibitors such as para-tertiary butylcatechol. The butadiene was obtained from the plant of Petroleum Chemicals Incorporated, Lake Charles, La.

Analyses of butadiene, typical of the butadiene which was used in these examples are as follows:

| Component: | Proportion by weight percent |
|---|---|
| Butadiene-1,3 | 98.36 |
| Isobutane | 0.00 |
| n-Butane | 0.00 |
| Isobutylene | 0.025 |
| Trans-butene-2 | 0.065 |
| Cis-butene-2 | 0.065 |
| Propylene | 0.58 |
| Propadiene | 0.075 |
| Butadiene-1,2 | 0.10 |
| Acetylenes (including ethylacetylene, methylacetylene, vinylacetylene, and dimethylacetylene) | 0.06 |
| Carbonyl | 0.002 |
| Water | 0.02 |

The acetylenic constituents of a similar butadiene sample were analyzed by gas chromatography, and the following compounds and amounts were found:

| Component: | Mole percent |
|---|---|
| Methylacetylene | 0.02 |
| Ethylacetylene | 0.04 |
| Dimethylacetylene | 0.01 |
| Vinylacetylene | 0.002 |

As can be seen, the diolefins as used in the examples contained other unsaturated hydrocarbons having 3-4 carbon atoms.

Example No. 18 was conducted with specifically purified polymerization grade butadiene produced by Phillips Petroleum Company and which contained similar impurities to those recited above but in much smaller amounts. A typical partial analysis of this type of butadiene is as follows:

| Component: | Proportion by weight percent |
|---|---|
| Acetylenes | 0.0006 (6 parts per million). |
| Propadiene | Below 0.001 (10 parts per million). |
| 1,2-butadiene | Less than 0.001 (10 parts per million). |

I claim:
1. In a process of preparing cycloolefins containing at least two carbon-to-carbon double bonds in the ring and at least eight carbon atoms in the ring, by oligomerizing a compound selected from the group consisting of substituted and unsubstituted conjugated open-chain diolefins at an elevated temperature and pressure, the improvement comprising the step of conducting said reaction at a tem- perature between about 40° C. and 250° C. in the presence of a catalyst selected from the group of compounds having the empirical formulas $[(RO)_3Z]_3NiCo$, $[R_x(RO)_{3-x}Z]NiCO$, $(R_3Z)_3NiCO$ and mixtures thereof, wherein R is selected from the radicals of the group consisting of hydrocarbon radicals and substituted hydrocarbon radicals, $x$ is 1 or 2, and wherein Z is selected from the group consisting of phosphorous, arsenic, and antimony.

2. The process of claim 1 in which Z is phosphorous.
3. The process of claim 1 in which Z is arsenic.
4. The process of claim 1 in which Z is antimony.
5. The process of claim 2 in which the elevated temperature is between 70° C. and 170° C.
6. The process of claim 5 in which the temperature is between 90° C. and 150° C.
7. The process of claim 2 in which the catalyst is a tris(triarylphosphite) nickel monocarbonyl compound.
8. The process of claim 7 in which the catalyst is tris(triphenylphosphite) nickel monocarbonyl.
9. The process of claim 1 in which at least one R is aryl.
10. The process of claim 1 in which at least one R is alkyl.
11. The process of claim 1 in which at least one R is cycloalkyl.
12. The process of claim 1 in which R comprises different radicals.
13. The process of claim 1 conducted in the presence of an organic solvent.
14. The process of claim 1 in which said diolefin is impure 1,3-butadiene containing relatively small amounts of other unsaturated hydrocarbons.
15. The process of claim 14 in which said other unsaturated hydrocarbons comprise acetylenic compounds.
16. The process of claim 1 in which said catalyst has the formula $[(RO)_3P]_3NiCO$.
17. The process of claim 16 in which said diolefinic compound is 1,3-butadiene.

References Cited by the Examiner
UNITED STATES PATENTS

| | | | |
|---|---|---|---|
| 2,943,116 | 6/60 | Benson | 260—666 |
| 2,964,575 | 12/60 | Sedul et al. | 260—666 |
| 2,972,640 | 2/61 | Burks et al. | 260—666 |
| 2,991,317 | 7/61 | Sellers et al. | 260—666 |
| 3,004,081 | 10/61 | Bosmajian | 260—666 |

OTHER REFERENCES

Reed: Journal of the Chemical Society (London), pp. 1931–1941, 1954.

ALPHONSO D. SULLIVAN, *Primary Examiner.*

UNITED STATES PATENT OFFICE
CERTIFICATE OF CORRECTION

Patent No. 3,187,062                                              June 1, 1965

Harold Shechter

It is hereby certified that error appears in the above numbered patent requiring correction and that the said Letters Patent should read as corrected below.

Column 4, line 16, for "know" read -- known --; columns 5 and 6, TABLE-Continued, third column, line 2 thereof, for "otylphenylphosphite" read -- octylphenylphosphite --; column 5, line 27, for "yield" read -- yields --; column 6, line 54, for "specifically" read -- specially --; column 7, line 3, for "$[(RO)_3Z]_3NiCo,$" read -- $[(RO)_3Z]_3NiCO,$ --; line 4, for "$[R_x(RO)_{3-x}Z]NiCO,$" read -- $[R_x(CO)_{3-x}Z]_3NiCO,$ --; column 8, line 18, for "Sedul et al." read -- Sekul et al. --.

Signed and sealed this 23rd day of November 1965.

(SEAL)
Attest:

ERNEST W. SWIDER                                    EDWARD J. BRENNER
Attesting Officer                                          Commissioner of Patents